(12) United States Patent
Barzelay

(10) Patent No.: US 10,427,276 B2
(45) Date of Patent: Oct. 1, 2019

(54) TORQUE MULTIPLIER MODULE

(71) Applicant: TYM LABS L.L.C., Saddle Brooke, NJ (US)

(72) Inventor: Abraham Barzelay, Paramus, NJ (US)

(73) Assignee: TYM LABS L.L.C., Saddle Brook, NJ (US)

( * ) Notice: Subject to any disclaimer, the term of this patent is extended or adjusted under 35 U.S.C. 154(b) by 245 days.

(21) Appl. No.: 15/469,186

(22) Filed: Mar. 24, 2017

(65) Prior Publication Data
US 2018/0272509 A1    Sep. 27, 2018

(51) Int. Cl.
| | |
|---|---|
| *B25B 17/02* | (2006.01) |
| *B25B 21/00* | (2006.01) |
| *F16H 57/04* | (2010.01) |
| *F16H 1/46* | (2006.01) |
| *F16H 57/029* | (2012.01) |
| *F16H 57/08* | (2006.01) |

(52) U.S. Cl.
CPC .............. *B25B 17/02* (2013.01); *B25B 21/00* (2013.01); *F16H 57/0408* (2013.01); *F16H 57/0486* (2013.01); *F16H 1/46* (2013.01); *F16H 57/029* (2013.01); *F16H 57/082* (2013.01)

(58) Field of Classification Search
CPC . B25B 17/02; B25B 21/00; F16H 1/46; F16H 57/0408; F16H 57/0486; F16H 57/029
See application file for complete search history.

(56) References Cited

U.S. PATENT DOCUMENTS

| | | | |
|---|---|---|---|
| 3,472,083 A | 10/1969 | Schnepel | |
| 3,861,244 A | 1/1975 | MacDonald | |
| 3,866,492 A | 2/1975 | Knoll | |
| 3,979,965 A * | 9/1976 | Vuceta | B25B 17/02 74/410 |
| 4,213,333 A | 7/1980 | Krieger et al. | |
| 4,362,072 A | 12/1982 | Tillman | |
| 4,535,653 A | 8/1985 | Coburn | |
| 4,627,310 A | 12/1986 | Coburn | |
| 4,720,000 A | 1/1988 | Snyder | |
| 5,125,297 A * | 6/1992 | Bai | B60B 29/005 81/57.3 |
| 5,176,047 A * | 1/1993 | Bai | B25B 17/00 81/57.24 |
| 5,709,136 A | 1/1998 | Frenkel | |
| 6,165,096 A | 12/2000 | Seith | |
| 6,305,236 B1 | 10/2001 | Sturdevant | |

(Continued)

FOREIGN PATENT DOCUMENTS

WO    WO 2005/073122 A1    8/2005

OTHER PUBLICATIONS

Search Report and Written Opinion dated Aug. 24, 2018, in PCT Application No. PCT/US2018/24012 (11 pages).

*Primary Examiner* — David B. Thomas

(57) ABSTRACT

A torque multiplier module is disclosed for use with a wrench. The torque multiplier module may include a sealed housing having an input opening and an output opening, and a planetary gear arrangement disposed inside the sealed housing. The planetary gear arrangement may be configured to engage an external input received from the wrench via the input opening. The torque multiplier module may also include a drive fitting connected to the planetary gear arrangement and accessible via the output opening.

20 Claims, 4 Drawing Sheets

(56) References Cited

U.S. PATENT DOCUMENTS

| | | | |
|---|---|---|---|
| 6,401,572 B1* | 6/2002 | Provost | B25B 17/02 81/57.14 |
| 8,584,554 B2* | 11/2013 | Chen | B25B 17/02 81/54 |
| 9,095,960 B2* | 8/2015 | Kim | B25B 13/461 |
| 2005/0039579 A1* | 2/2005 | Wallace | B25B 13/467 81/57.3 |
| 2006/0096421 A1 | 5/2006 | Wexler | |
| 2011/0036206 A1 | 2/2011 | Yang | |
| 2015/0033917 A1* | 2/2015 | Chen | B25B 17/02 81/479 |
| 2017/0197300 A1* | 7/2017 | Lin | B25B 23/0035 |

\* cited by examiner

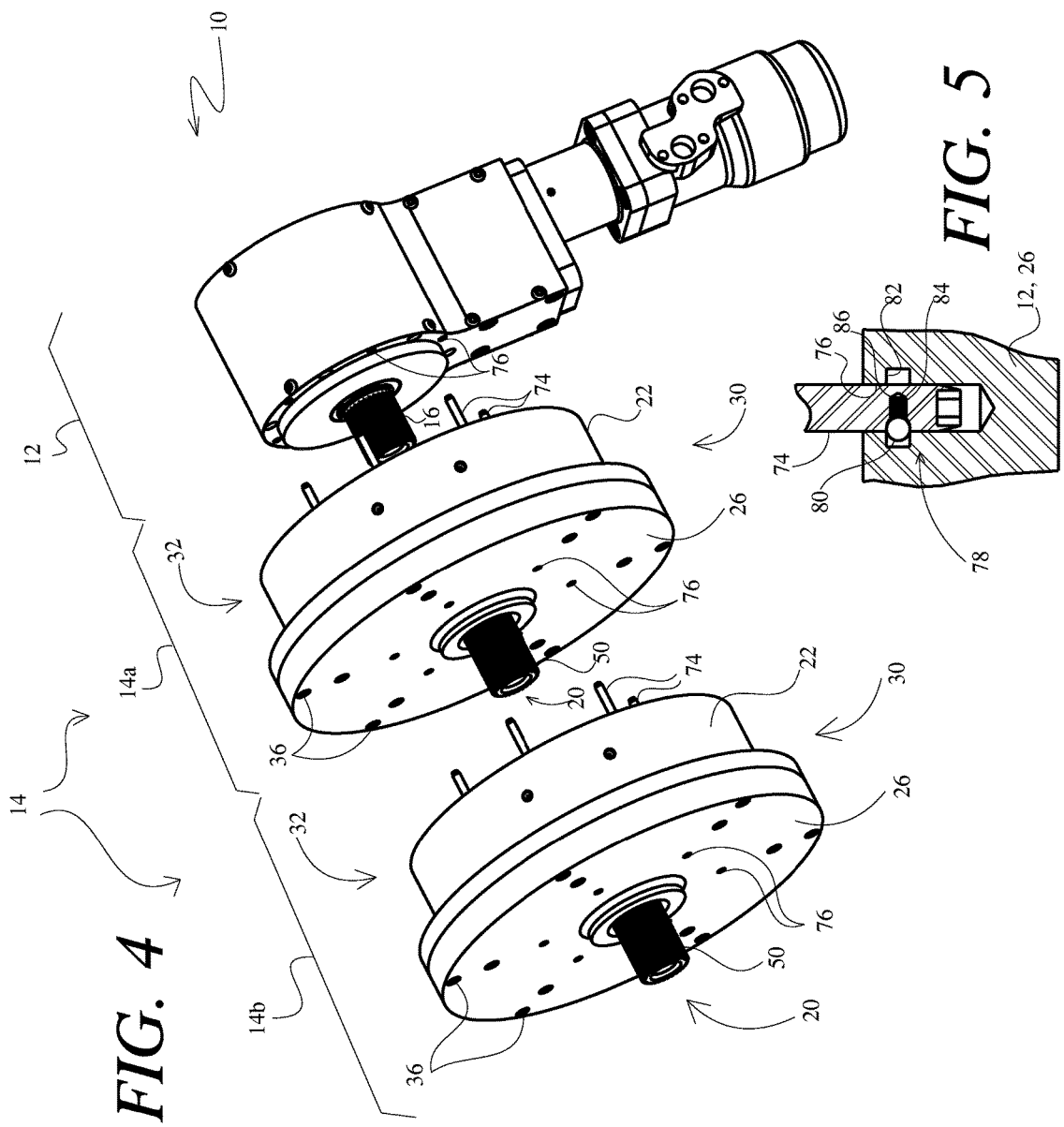

TORQUE MULTIPLIER MODULE

TECHNICAL FIELD

The present disclosure is directed to a torque multiplier module and, more particularly, to a module that is connectable to a wrench for multiplying torque transfer to a fastener.

BACKGROUND

A wrench is a tool designed to exert torque on a fastener (e.g., on a bolt head or nut) to loosen or tighten the fastener. In some embodiments, the wrench is powered. For example, the wrench can be hydraulically, pneumatically, or electrically powered by an associated motor. In other examples, the wrench is manually manipulated. Regardless of the way in which the wrench is powered, in some situations, the force exerted by the wrench on the fastener is too little.

High-torque wrenches are currently available. For example, hydraulically and/or pneumatically powered wrenches can include large pistons, which can be supplied with high-pressure fluid to generate proportionally large torque outputs. Similarly, large manual wrenches are available with long handles that proportionally transform a low-input force into a high-output torque. Although these wrenches can be useful in some situations where high-torque is required, they may be large, heavy, unwieldy, and/or slow. For this reason, the high-torque wrenches are generally used for only high-torque situations that cannot otherwise be managed. The limited applicability of a high-torque wrench increases an operating, storage, and/or transportation cost of the wrench.

The torque multiplier module of the present disclosure solves one or more of the problems set forth above and/or other problems of the prior art.

SUMMARY

One aspect of the present disclosure is directed to a torque multiplier module for use with a wrench. The torque multiplier module may include a sealed housing having an input opening and an output opening, and a planetary gear arrangement disposed inside the sealed housing. The planetary gear arrangement may be configured to engage an external input received from the wrench via the input opening. The torque multiplier module may also include a drive fitting connected to the planetary gear arrangement and accessible via the output opening.

Another aspect of the present disclosure is directed to another torque multiplier module. This torque multiplier module may include a housing, and a valve configured to unidirectionally receive pressurized lubrication into the housing. The torque multiplier module may also include a planet carrier rotational disposed inside the housing, a plurality of planet gears operatively connected to the planet carrier and configured to engage an external input, and a ring gear engaged with the plurality of planet gears and rotationally fixed to the housing. The torque multiplier module may further include a drive fitting connected to the planet carrier. The torque multiplier module may be configured to produce an output torque at the drive fitting that is greater than an input torque received by the planetary gears from the external input.

Another aspect of the present disclosure is directed to a torque assembly. The torque assembly may include a wrench, and a first torque multiplier module connected to the wrench and configured to receive and multiply a first torque input received from the wrench. The torque assembly may also include a second torque multiplier module connected to the first torque multiplier module and configured to receive and multiply a second torque input received from the first torque multiplier module.

BRIEF DESCRIPTION OF THE DRAWINGS

FIG. 4 is an isometric view illustration of another exemplary disclosed torque assembly; and FIG. 5 is a cross-sectional illustration of an exemplary portion of the torque assembly shown in FIG. 4.

DETAILED DESCRIPTION

Figure 1:
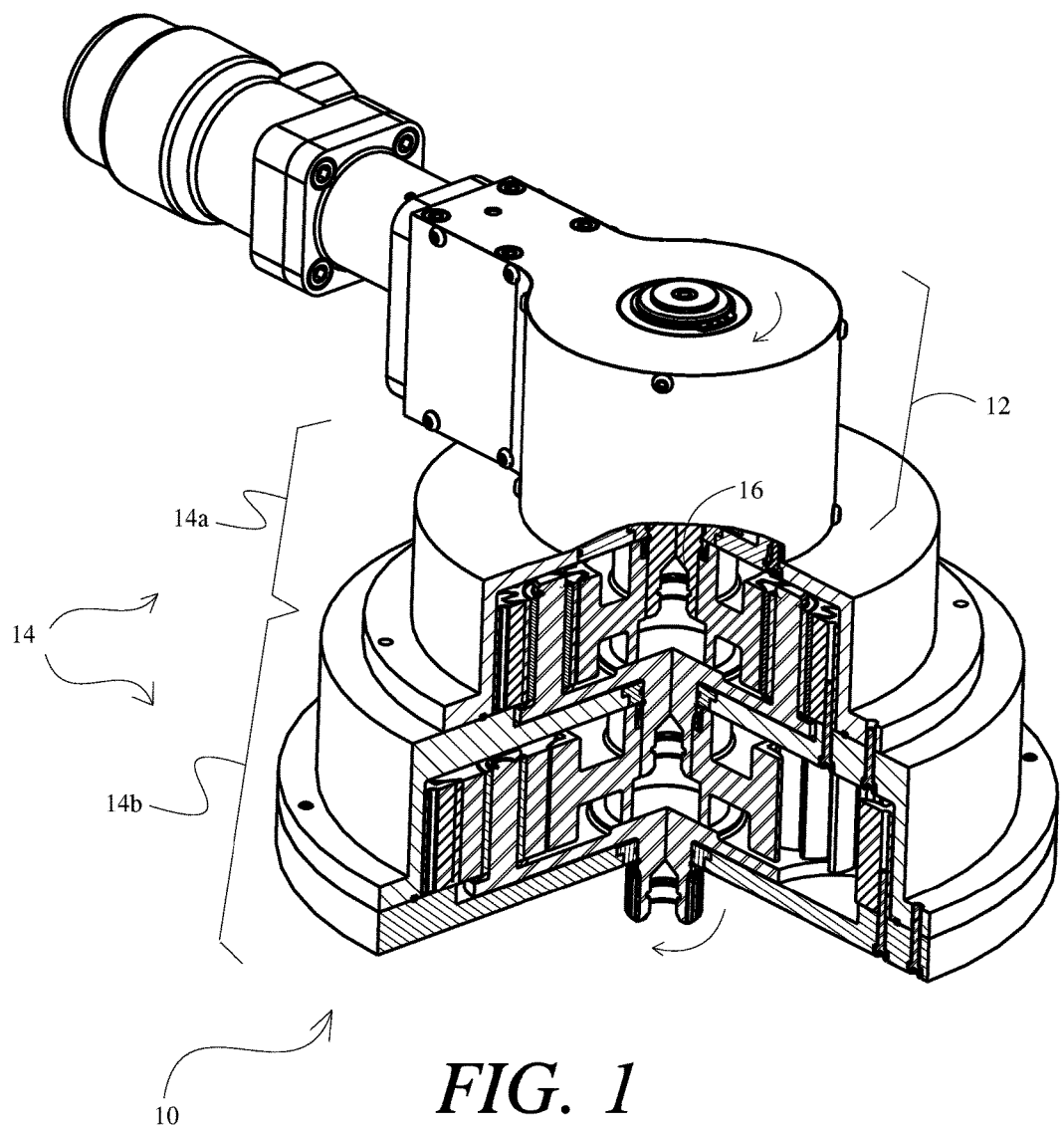
FIG. 1 is an isometric illustration of an exemplary disclosed torque assembly.

FIG. 1 illustrates an exemplary torque assembly 10 that can be used to loosen or tighten a fastener (e.g., a bolt or a nut—not shown). Torque assembly 10 may include a wrench 12 and at least one torque multiplier module 14 temporarily connected to wrench 12. Wrench 12 may be powered (e.g., electrically, hydraulically, and/or pneumatically powered) or manually manipulated to generate a torsional output used to rotate the fastener. Regardless of the manner in which wrench 12 is driven, wrench 12 may include a drive fitting 16 that transmits the torsional output of wrench 12 to a connected torque multiplier module 14 as an input. In the disclosed example, drive fitting 16 is a male fitting (e.g., a splined, torx, or square shaft). It is contemplated, however, that drive fitting 16 could instead be a female fitting configured to receive a corresponding male adapter (not shown) from torque multiplier module 14, if desired.

In the embodiment of FIG. 1, two similar torque multiplier modules 14 are included. The first torque multiplier module 14a is connected to multiply the torsional input received directly from wrench 12, while the second torque multiplier module 14b is connected to multiply a torsional input received from the first torque multiplier module 14a. It should be noted that any number of torque multiplier modules 14 may be used together and stacked axially onto wrench 12 and/or on to each other to provide as output any desired multiple of the torque generated by wrench 12.

In the embodiment of FIG. 1, first torque multiplier module 14a is different than second torque multiplier module 14b. For example, a size, a shape, and/or a torque ratio of input-to-output may be different between the modules. It is contemplated that some or all of the torque multiplier modules 14 used within a single torque assembly 10 could be substantially identical (e.g., within engineering tolerances), if desired.

Figure 2:
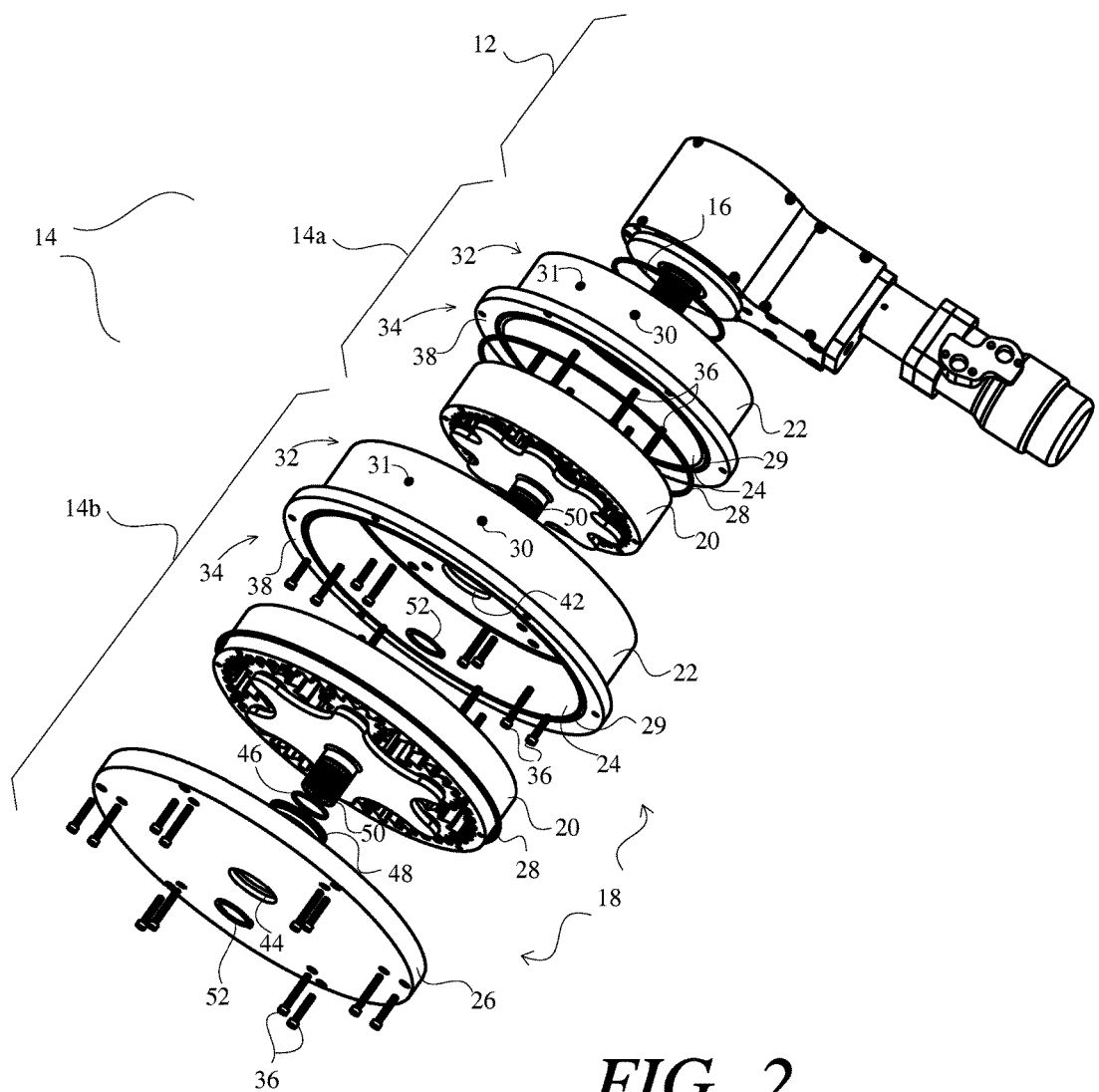
FIG. 2 is an exploded view illustration of the torque assembly of FIG. 1.

As shown in FIG. 2, each torque multiplier module may be a self-contained assembly of components that cooperate to transmit a received torque from an input end to an output end at a multiplied level. These components may include, among other things, a housing 18 and a planetary gear arrangement 20 disposed inside of housing 18.

Housing 18 may include a base 22 having a central bore 24 configured to receive planetary gear arrangement 20, and an end plate 26 configured to engage and cap off central bore 24. In the disclosed embodiment, base 22 is generally cylindrical. It is contemplated, however, that base 22 could have another shape, if desired. A seal (e.g., a double-lip seal that can be sealed by external pressures for underwater applications, an o-ring, a gasket, a single-lip seal, and/or another type of seal) 28 may be disposed between base 22 and end plate 26 (e.g., within an annular groove 29) to seal central bore 24 and planetary gear arrangement 20 from the environment. In some embodiments, a lubrication valve 30 may be mounted within housing 18 (e.g., within a wall of base 22) and used to unidirectionally receive a pressurized lubricant (e.g., grease). In these embodiments, an additional pressure relief valve 31 may be also be mounted to housing 18 and used to release air from housing during lubrication filling and/or to relieve excess pressures during operation. In this way, housing 18 may be positively pressurized to a level above ambient, such that ingress of water and/or debris may be inhibited. The sealed nature of housing 18, combined with an inherent low rotational speed and temperature of planetary gear arrangement 20 therein, may help to reduce maintenance requirements. In particular, the grease may be retained inside housing 18 for a life of torque multiplier module 14 without significant degradation (e.g., because of the clean environment inside of sealed housing 18).

It should be noted that, when multiple torque multiplier modules 14 are stacked together axially, end plate 26 may not be required for each module 14. For example, only a final module 14 in the stack (i.e., the module 14 located furthest from wrench 12) may require end plate 26. In this example, the remaining modules 14 may instead use a closed end 32 of an adjacent base 22 as the end plate (i.e., to cap off the associated central bore 24). In this situation, seal 28 may be disposed between an open end 34 of the associated base 22 and closed end 32 of the adjacent base 22. One or more fasteners 36 may be used to join end plate 26 to base 22 and/or to join the closed end 32 of one base 22 to the open end 34 of an adjacent base 22.

In some embodiments, base 22 may include an annular flange 38 located at open end 34 of base 22. Annular flange 38 may function as a seat for an adjacent torque multiplier module 14, when more than one module 14 is used within torque assembly 10. In this situation, fasteners 36 may pass through closed end 32 into annular flange 38 to axially and rotationally fix the two bases 22 to each other. In order to facilitate this connection configuration, the sizes of bases 22 must be increasingly larger for modules 14 located further away from wrench 12. When joining the first torque module 14 to wrench 12, fasteners 36 may instead pass through the closed end 32 of base 22 and into wrench 12 (e.g., into a housing of wrench 12) to axially and rotationally fix base 22 of the first torque multiplier module 14 to wrench 12.

Housing 18 may include an input opening 42 configured to pass an input torque into the associated torque multiplier module 14, and an output opening 44 configured to pass a larger output torque out of the associated torque multiplier module 14. In the example of FIG. 2, input opening 42 is formed in base 22, while output opening 44 is formed in end plate 26. It is contemplated, however, that the orientation of torque multiplier module 14 (specifically of base 22 and end plate 26) could be reversed, if desired. An additional seal 46 and/or a bushing 48 may be associated with one or both of input and output openings 42, 44 (bushing 48 is shown as being associated with only output opening 42 in the example of FIG. 2).

In some applications, planetary gear arrangement 20 and a portion of the associated or an adjacent housing 18 may be joined in a sub-assembly during manufacture, in order to facilitate simpler and/or quicker connection with wrench 12 in the field. For example, a drive fitting 50 of each torque multiplier module 14 may be passed either through output opening 42 of the associated end plate 26 (and through the associated seal 46 and bushing 48) of the same torque multiplier module 14 (e.g., when the torque multiplier module 14 is the last in a stack of modules 14 or the sole module 14 in use) or through input opening 40 of the next module 14 in the stack. Thereafter, a retainer (e.g., a circlip, a snapring, etc.) 52 may be connected to drive fitting 50 (e.g., to an annular groove formed within an outer surface of drive fitting 50) to inhibit separation of the corresponding housing component and planetary gear arrangement 20. In this configuration, base 22 of the sole module 14 or of an earlier module 14 in the stack may be fastened in place (e.g., via fasteners 36), and then the sub-assembly may be connected to base 22 and filled with lubrication. This may reduce the field-assembly process by at least one step (e.g., by eliminating the need to assemble planetary gear arrangement 20 separately).

Figure 3:
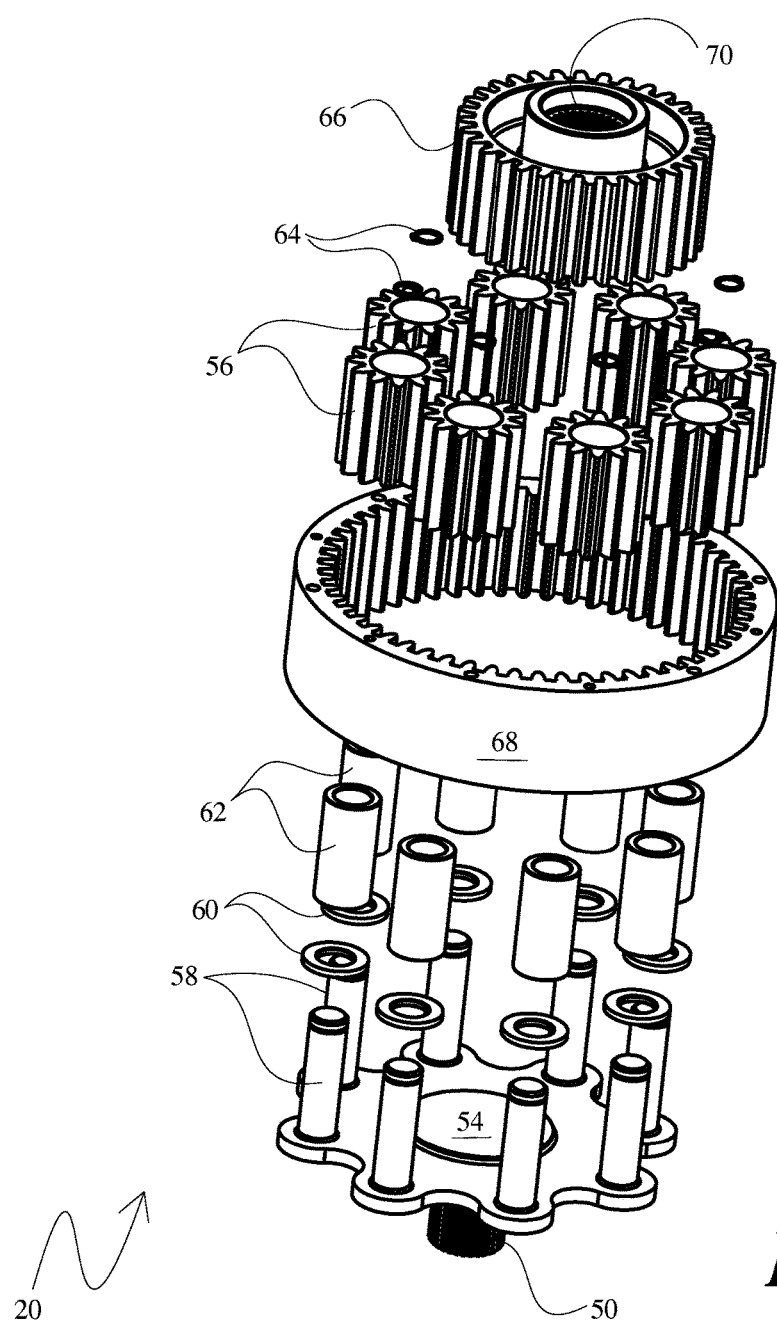
FIG. 3 is an exploded view illustration of an exemplary disclosed torque multiplier module that forms a portion of the torque assembly of FIGS. 1 and 2.

FIG. 3 illustrates an exemplary planetary gear arrangement 20 that may be used in torque multiplier module 14 (referring to FIGS. 1 and 2). For the purposes of this disclosure, a planetary gear arrangement may have at least three elements, including a sun gear, a planet carrier having at least one set of connected planet gears, and a ring gear. The planet gears of the planet carrier mesh with the sun gear and the ring gear. One of the sun gear, planet carrier and ring gear is driven as an input, while another of the sun gear, planet carrier, and ring gear rotates as an output. A combination of the sun gear, planet carrier, planet gears, and ring gear can rotate simultaneously to transmit power from the input to the output at a desired ratio of speed-to-torque. The speed-to-torque ratio of the planetary gear arrangement depends upon the number of teeth in the sun and ring gears, the gear(s) that is selected as the input, the gear(s) that is selected as the output, and which gear, if any, is held stationary or rotationally locked with another gear.

In the exemplary embodiment of FIG. 3, planetary gear arrangement 20 includes a single planet carrier 54 supporting eight substantially identical (e.g., within engineering tolerances) planet gears 56 (e.g., via separate shafts 58, spacers 60, bushings 62, and retainers 64); a single sun gear 66, and a single ring gear 68. It should be noted that any number of planet gears 56 could be mounted to planet carrier 54, as desired. Sun gear 66 may be engaged by drive fitting 16 of wrench 12 and/or drive fitting 50 of another torque multiplier module 14, for example via internal and/or external features (e.g., splines, teeth, hexagonal and/or square socket, etc.) 70. It is also contemplated that sun gear 66 may be omitted in some embodiments, and drive fittings 16 and/or 50 may function directly as the sun gear if desired. Sun gear 66 may mesh with each of planet gears 56, which may in turn mesh with internal teeth of ring gear 68. Planet gears 56 may be connected to rotate together with planet carrier 54, and to also rotate on bushings 62 about shafts 58. Ring gear 68 may be held stationary within housing 18 (e.g., via fasteners 36—referring to FIG. 2). Planet carrier 54 may be connected to rotate drive fitting 50. Thus, as shown in FIG. 3, the motion and power of wrench 12 (or of a another torque multiplier module 14) may be transmitted through planetary gear arrangement 20 to drive fitting 50 via sun gear 66, planet gears 56, and planet carrier 54, with ring gear 68 being fixed and only affecting the speed-to-torque ratio of the motion. Because planetary gear arrangement 20 is mounted inside housing 18 (referring to FIG. 2), planetary gear arrangement 20 may be sealed from the environment at a positive pressure.

FIG. 4 illustrates another embodiment of torque assembly 10. Like torque assembly 10 of FIG. 3, torque assembly 10 of FIG. 4 may also include any number of torque multiplier modules 14 stacked on top of each other and/or on top of wrench 12 to multiply the torque generated by wrench 12 to a desired level. Each of the torque multiplier modules 14 shown in FIG. 4 may include planetary gear arrangement 20 supported within housing 18. However, in contrast to torque assembly 10 of FIG. 3, each of the torque multiplier modules 14 of FIG. 4 may be fully assembled, permanently sealed, self-contained, and substantially identical (e.g., within engineering tolerances). No disassembly or reassembly of individual torque multiplier modules 14 may be required to put together torque assembly 10. This may improve use of torque assembly 10 in field applications.

Instead of threaded fasteners holding torque multiplier modules 14 of the FIG. 4—embodiment together (i.e., fasteners 36 that can be installed only when planetary gear arrangement is removed from base 22), torque multiplier modules 14 may be rotationally fixed in place by way of pins 74. Pins 74 may be rigidly connected to closed end 32 of each housing base 22 and extend in a normal direction for removable insertion into corresponding bores 76 formed within an adjacent surface (e.g., within a face of wrench 12 and/or within end plate 26). With this configuration, relative rotation between housings 30 and/or between housing 18 and a housing of wrench 12 may be inhibited. This fixed nature of housing 18 may be translated to ring gear 68 (referring to FIG. 3) via fasteners 36 in the same manner described above, such that ring gear 68 does not rotate relative to housing 18 and functions only to adjust the speed-to-torque ratio of planetary gear arrangement 20.

In some applications, inadvertent axial separation of torque multiplier modules 14 from each other and/or from wrench 12 may be undesired. For this reason, one or more of pins 74 may be axially retained within bores 76 via a retention mechanism 78, as shown in FIG. 5.

Retention mechanism 78 may include, among other things a spring-biased engagement member (e.g., a pin or a ball) 80 that is configured to engage a radial groove or slot 82 formed inside of bore 76. A spring 84 may be used to urge engagement member 80 at least partially out of pin 74 and into slot 82 during insertion of pin 74 into bore 76. For example, as pin 74 is pushed into bore 76, engagement member 80 may be forced into pin 74, allowing full insertion of pin 74. At some point during this insertion, engagement member 80 may generally align with slot 82, and be displaced by spring 84 into an extended and locked position. At this time, pin 74 may be inhibited from inadvertent axial retraction from bore 76. However, when a threshold amount of pulling force is applied to pin 74 (e.g., during desired axial separation), chamfered edges of slot 82 may push engagement member 80 back into its original position in pin 74, thereby allowing full retrieval of pin 74.

INDUSTRIAL APPLICABILITY

The torque multiplier module of the present disclosure has wide application in many different industries. The disclosed torque multiplier module may be used anywhere that fasteners are to be loosened or tightened with high-levels of torque. For example, the disclosed torque multiplier module may be used in the oil and gas industry to join segments of a pipeline together.

The disclosed torque multiplier module may be capable of reliably producing high-levels of output torque based on a lower level of input torque received from a manual wrench or from a powered wrench having limited torque output. Any number of torque multiplier modules may be stacked on top of each and on top of the wrench to provide any desired level of torque output.

The disclosed planetary gear arrangement inside each torque multiplier module may allow for efficient torque transmission with little or no backlash. Further, because the disclosed torque multiplier module may rely on a planetary gear arrangement, the overall weight and size of each module may be small (e.g., because of nesting capabilities inherent to planetary gear arrangements).

The disclosed torque multiplier module may be versatile. Specifically, because the disclosed torque multiplier module may be used with any wrench, even low-torque wrenches may become capable, via the module, for use with large and/or high-torque fasteners. This may reduce the amount of equipment that a technician must possess, carry around, and maintain, while also expanding the capability of the technician. All of this may help to reduce an associated owning and operating cost, while also increasing business opportunities.

Finally, the disclosed torque multiplier module may be simple and low-cost to maintain. In particular, because the disclosed torque multiplier module may be sealed and pressurized, the torque multiplier module may not need to be opened, cleaned, and/or lubricated frequently. In addition, the sealed and positively pressurized nature of the disclosed torque multiplier module may allow for usage in locations and/or conditions (e.g., underwater and/or in contaminated environments) not heretofore possible.

It will be apparent to those skilled in the art that various modifications and variations can be made to the torque multiplier module of the present disclosure without departing from the scope of the disclosure. Other embodiments will be apparent to those skilled in the art from consideration of the specification and practice of the torque multiplier module disclosed herein. It is intended that the specification and examples be considered as exemplary only, with a true scope of the disclosure being indicated by the following claims and their equivalents.

What is claimed is:

1. A torque multiplier module for use with a wrench, comprising:
   a sealed housing having an input opening and an output opening;
   a planetary gear arrangement disposed inside the sealed housing and configured to engage an external input received from the wrench via the input opening;
   a drive fitting connected to the planetary gear arrangement and accessible via the output opening; and
   wherein the sealed housing is rotationally fixed to the wrench when the planetary gear arrangement is engaged with the external input by at least one pin that is fixed to the sealed housing and configured to slidingly engage a bore in the wrench to rotationally fix the sealed housing to the wrench.

2. The torque multiplier module of claim 1, wherein the planetary gear arrangement includes:
   a planet carrier rotationally disposed inside the sealed housing; and
   a plurality of planet gears operatively connected to the planet carrier and configured to engage the external input.

3. The torque multiplier module of claim 2, further including a ring gear engaged with the plurality of planet gears.

4. The torque multiplier module of claim 3, wherein the ring gear is rotationally fixed to the sealed housing.

5. The torque multiplier module of claim 2, wherein the drive fitting is fixed to the planet carrier at a side opposite the plurality of planet gears.

6. The torque multiplier module of claim 5, wherein the drive fitting extends through the output opening of the sealed housing.

7. The torque multiplier module of claim 1, wherein the sealed housing may be positively pressurized.

8. The torque multiplier module of claim 7, further including a valve configured to unidirectionally receive pressurized lubrication into the housing.

9. The torque multiplier module of claim 1, wherein there are a plurality of pins fixed to the sealed housing and configured to slidingly engage a respective bore in the wrench to rotationally fix the sealed housing to the wrench.

10. The torque multiplier module of claim 1, wherein the at least one pin is spring biased into the bore in the wrench.

11. The torque multiplier module of claim 1, wherein the sealed housing includes:
   a base having a central bore configured to receive the planetary gear arrangement;
   an end plate configured t close off the central bore; and
   at least one of a double-lip seal and an o-ring disposed between the end plate and the base.

12. The torque multiplier module of claim 11, wherein the end plate and the planetary gear arrangement form a sub-assembly that is connectable as a single unit to the base after the base is rotationally fixed to the wrench.

13. The torque multiplier module of claim 11, wherein the base of the sealed housing includes:
   a closed end configured to engage the wrench;
   an open end located opposite the closed end and configured to receive the end plate; and
   an annular flange at the open end that is configured to provide seating for a-another torque multiplier module.

14. The torque multiplier module of claim 1, wherein the sealed housing includes a valve configured to unidirectionally receive pressurized lubrication.

15. The torque multiplier module of claim 1, wherein the planetary gear arrangement is configured to produce an output torque at the drive fitting that is greater than an input torque received from the wrench.

16. A torque multiplier module, comprising:
   a housing;
   a valve configured to unidirectionally receive pressurized lubrication into the housing;
   a planet carrier rotational disposed inside the housing;
   a plurality of planet gears operatively connected to the planet carrier and configured to engage an external input;
   a ring gear engaged with the plurality of planet gears and rotationally fixed to the housing; and
   a drive fitting connected to the planet carrier;
   wherein the torque multiplier module is configured to produce an output torque at the drive fitting that is greater than an input torque received by the plurality of planet gears from the external input and wherein the housing is rotationally fixed to the external input by at least one pin that is fixed to the housing and configured to slidingly engage a bore in the external input.

17. The torque multiplier module of claim 16, wherein the housing includes:
   a base having a central bore configured to receive the planet carrier, the plurality of planet gears, and the ring gear;
   an end plate configured to close off the central bore; and
   at least one of a double-lip seal and an o-ring disposed between the end plate and the base.

18. The torque multiplier module of claim 17, wherein the base of the housing includes:
   a closed end;
   an open end located opposite the closed end and configured to receive the end plate; and
   an annular flange at the open end.

19. A torque assembly, comprising:
   a wrench;
   a first torque multiplier module connected to the wrench and configured to multiply a first torque input received from the wrench; and
   a second torque multiplier module connected to the first torque multiplier module and configured to multiply a second torque input received from the first torque multiplier module,
   wherein the first torque multiplier module is rotationally fixed to the second torque multiplier module by at least one pin that is fixed to one of the first torque multiplier module and the second torque multiplier module and is configured to slidingly engage a bore in the other of the first torque multiplier module and the second torque multiplier module to rotationally fix the first torque multiplier module to the second torque multiplier module.

20. The torque assembly of claim 19, wherein each of the first and second torque multiplier modules includes:
   a sealed housing having an input opening and an output opening;
   a planetary gear arrangement disposed inside the sealed housing and configured to engage an external input received via the input opening; and
   a drive fitting connected to the planetary gear arrangement and accessible via the output opening.

* * * * *